United States Patent Office 3,442,826
Patented May 6, 1969

3,442,826
METHOD OF PREPARING POLYPEPTIDE GRAFT COPOLYMERS
Henri G. G. Dekking, Fullerton, Calif., assignor to Union Oil Company of California, Los Angeles, Calif., a corporation of California
No Drawing. Filed Mar. 9, 1964, Ser. No. 350,531
The portion of the term of the patent subsequent to Sept. 28, 1982, has been disclaimed and dedicated to the Public
Int. Cl. D06m 13/00; C08h 7/04
U.S. Cl. 260—8    5 Claims

ABSTRACT OF THE DISCLOSURE

The invention comprises the graft propagation of a synthetic polymer from a polypeptide by base exchange of an organic azo compound having a functional group capable of undergoing base exchange with the ion exchange sites of the polypeptide. The resulting polypeptide-azo compound is thereafter heated in the presence of an ethylenically unsaturated monomer under solution, bulk or emulsion polymerization. Free radicals remain ionically bonded to the polypeptide and initiate polymerization of the monomer to propagate a polymer chain from the polypeptide. In this manner a synthetic monomer can be grafted to the polypeptide with a single terminal point of attachment. Preferred azo compounds are those having at least two bis-ion exchange groups or heterocyclic azo compounds wherein the azo nitrogens are within the heterocyclic ring are employed. The homolytic fission of these azo compounds results in the formation of free radicals, most of which are bonded to the polypeptide, thereby reducing the amount of homopolymer that is formed by unattached radicals in the polymerization.

---

This invention relates to graft copolymers of polypeptides and synthetic vinyl polymers and to a method for their preparation.

A number of naturally occurring polymers, particularly natural fibers such as silk and wool are polypeptides, i.e., polyamides of amino acids. These polymers are widely used in the textile industry. Their use, however, is in competition with synthetic fibers, some of which are superior in regard to some fiber characteristics. Despite this competition, these naturally occurring polypeptides remain popular because of their good insulating properties, wrinkle and soil resistance and dyeability. Their use, however, could be increased if some of the synthetic polymer characteristics such as moth and mildew resistance, shrinkage resistance, etc., were permanently imparted to the polypeptide.

The formation of stable graft copolymers of these naturally occurring polymers with synthetic polymers could permanently impart the latter's desired properties to the natural fiber and thereby greatly expand its use; e.g., by imparting desired properties such as stiffness, wrinkle resistance, water repellancy and rot resistance, greater strength, etc., to the polypeptides.

I have now found that various synthetic polymers having an ionically charged radical can be readily grafted to the aforementioned polypeptides by utilizing reactive groups on the polypeptides as ion exchange sites for grafting of the polymer. The resultant graft copolymers of my invention comprise a synthetic polymer bearing a terminally positioned ionically charged group that is attached through an ionic bond to an ion exchange site of the polypeptide.

The aforementioned copolymers can be prepared by reacting, under base exchange conditions, an ionically charged polymer with the polypeptide.

In a preferred form of my invention, I have discovered that synthetic polymers can be readily graft propagated from the polypeptide molecule by base exchanging an ionically charged polymerization initiator onto the polypeptide to thereby obtain a polypeptide-initator adduct and thereafter using said adduct to initiate polymerization of an ethylenically unsaturated monomer that undergoes polymerization by free radical initiation.

Polypeptides form the basis of natural proteins and are characterized by the following repeating structural unit:

wherein R can be:
  Hydrogen as in glycine;
  Alkyl, e.g., methyl as in alamine, butyl as in levo- and dextro- leucine, isobutyl as in isoleucine; hydroxyalkyl, e.g.,
    Hydroxymethyl as in aspartic acid;
    Carboxyethyl as in glutamic acid;
  Aralkyl and hydroxyaralkyl, e.g., parahydroxybenzyl as in levo- and dextro-tryosine;
  Aminoalkyl and N-substituted amino alkyl, e.g., N-amidinyl-aminopropyl as in arginine; etc.

R can also be bivalent and crosslink alpha amino acids, typically the cystine linkage of wool wherein R is dimethyl disulfide.

R can also comprise a cyclic moiety bridging the alpha carbon and nitrogen of the amino acid to form a heterocyclic derivative, e.g., when R is trimethylene the alpha amino acid is proline.

As previously mentioned, the naturally occurring polypeptides are characterized by the aforementioned repeating structural unit. Thus, wool is a complex polypeptide or polyamide of about 20 alpha amino acids including the aforementioned glycine, leucine, isoleucine, proline, cystine, arginine, glutamic acid and aspartic acid. Silk is a polypeptide made up of the four amino acids, flycine, alinine, serine and tryosine. Casein is a polypeptide derived from the dairy industry or extracted from peanuts and comprises the aforementioned alpha amino acids. Casein can be obtained in a fibrous form for blending with the aforementioned polypeptide fibers or casein plastics can be employed as molding compositions. Zein is a protein extracted from corn with isopropyl alcohol. It can be purified and spun into fibers similar to the other proteins.

The aforementioned naturally occurring polypeptides contain a plurality of sidechains having acid or amine groups along their length which can be utilized for base exchange reactions. In particular, according to my invention, these sites can be employed for the grafting of ionically charged polymers or polymerization initiators. As previously mentioned, a large proportion, e.g., between about 10 and 50 percent, of the naturally occurring polypeptide mass occurs in sidechains and approximately 10 to about 50 percent of these sidechains have carboxylic acid or amine groups along their length. Consequently, these fibers have appreciable ion exchange properties which can be utilized as grafting sites. I prefer to wash the polypeptide with a dilute solution of an acid such as sulfuric, nitric, hydrochloric, etc., to insure that the basic nitrogen of the amine group is in its highest positive valence, i.e., as the ammonium salt. Acid concentrations of between about 0.1 and 1.0 normal can so be used when cation exchange capacity is required.

The resultant polypeptide having ion exchange properties can be employed under base exchange conditions with a suitable organic addent as follows:

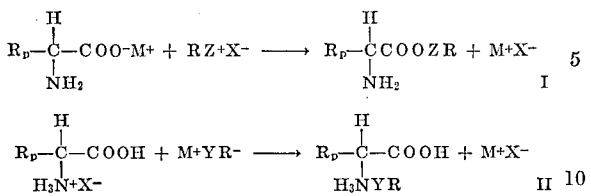

wherein:

$R_p$ represents the aforementioned polypeptide structure having a reactive sidechain;

R represents an ionically charged organic addent, i.e., the ionically charged synthetic vinyl polymer or ionically charged polymerization initiator;

Z represents a suitable cationic radical attached to said R groups;

Y represents a suitable anionic radical attached to said R group;

X represents a suitable inert and water soluble anion; and

M represents a suitable inert and water soluble cation.

Because the polypeptide is water insoluble, the resultant polypeptide-organic adduct which is formed can be readily recovered from the aqueous solution used in the base exchange reaction. As previously mentioned, M and X are chosen to be water soluble ions that are inert to the reactants and hence, the organic adduct can be purified by simple water washing.

The aforedescribed reactions are performed under base exchange conditions. Generally, such conditions are achieved by contacting the polypeptide with an aqueous solution or suspension of the ionically charged organic addent at ambient temperatures, e.g., 0° to 100° C., preferably 20° to 35° C., due care being exercised to avoid excessive temperatures that would decompose any reactant or cause any other undesired reaction. In reaction I, the cationic addent can have any suitable inert anion associated therewith such as a halide, e.g., chloride, bromide, fluoride, iodine, sulfate; nitrate; hydroxide; phosphate; carboxylate, e.g., acetate, propionate, butyrate, etc. As previously mentioned, it is preferred that the particular anion will form a water soluble compound with the cation, M, of the polypeptide so that the organic adduct can be freed of contaminants by water washing. Accordingly, I prefer to use the halide or hydroxide anions; most preferably, the chloride. In reaction II, the anionic addent can have any suitable cation, generally a hydrogen ion, associated therewith that is inert with the other reactants and that will form a water soluble compound with the anion on the polypeptide. The anion can also be an alkali metal such as sodium, potassium, lithium, cesium, etc. If desired, however, ammonium or alkaline earth metals such as calcium, magnesium, etc., or any of the transitional metals such as aluminum, copper, iron, cobalt, molybdenum, nickel, etc., can be employed. As previously mentioned, however, due regard is exercised in choice of the particular cation, M, and anion, X, so as to preclude the formation of an insoluble compound, MX. For this reason, I prefer to employ hydrogen, ammonium or alkali metal cations.

In reaction I, various cationic groups can be employed on the organic addent to serve as the link between the polypeptides and the synthetic polymer. In general, any onium compound of the type $RZH_y$ can be used; these are isologs of ammonium and contain the element Z in its highest positive valency. Z can be pentavalent as in ammonium, phosphonium, arsonium, stibonium; Z can be tetravelent as in oxonium, sulfonium, selenonium and stannonium; and Z can be trivalent as in indoium. Of the aforementioned, the derivatives of basic nitrogen groups such as ammonium, amidinium and quaternary salts are, of course, the most common and therefore these basic nitrogen derivatives serve as the preferred onium group for linking the polypeptide and synthetic polymer in accordance with my invention.

The ammonium terminated polymers can be obtained from amine terminated polymers which, in turn, can be obtained by one of several methods. In one method, available for a limited number of polymeric materials, the amine terminated polymers can be obtained by anionic chain homo- or co-polymerization of vinyl monomers. This polymerization is initiated by an amide ion that becomes an integral part of the polymer. The polymerization is performed in liquid ammonia and is initiated by the addition of an alkali metal amide to the reaction medium or by the addition of an alkali metal such as sodium, potassium, cesium, etc., with a suitable catalyst to form the amide ion in situ. Any of the following monomers can be polymerized or copolymerized in this manner to produce amine terminated polymer and copolymer chains: styrene, acrylonitrile and methacrylonitrile. Various copolymers such as styrene-acrylonitrile copolymer, styrene-methacrylonitrile copolymer, acrylonitrile-methacrylonitrile copolymer, etc. can also be obtained in this manner. The polymerization is performed in ammonia at atmospheric or superatmospheric pressure so as to maintain the ammonia in a liquid phase. Generally between about 1 and 200 atmospheres are employed and the polymerization is performed at temperatures between about —75° and about 120° C., the lowest temperatures tending to favor the highest molecular weight polymers. The resultant polymers contain the initiating amide ion at the end of the polymer chain and this amide ion can be readily converted to an ammonium salt for base exchange with the polyeptide material in the manner hereafter described.

Amine and amidine terminated synthetic polymers can also be obtained from the polymerization of a variety of ethylenically unsaturated monomers with azo compounds having the following structure:

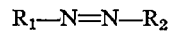

wherein at least one and preferably both $R_1$ and $R_2$ contain a basic nitrogen group; and $R_1$ and $R_2$ are selected from the class consisting of aryl, alkaryl, aminoaryl, amidinylaryl, aminoalkaryl, amidinylalkaryl, alkyl, amidinylalkyl, aminoalkyl, aralkyl, amidinylaralkyl and aminoaralkyl.

Preferably, the cationic azo compounds have secondary or tertiary carbons vicinal to the azo nitrogen. Representative of this class of bi-functional azo compounds are the following:

Where $R_1$ is aryl or alkaryl and $R_2$ is aminoalkyl, amidinylalkyl, aminoaralkyl or amidinylaralkyl: phenylazomethylamine, phenylazopropylamine, 2-naphthylazomethylamine, p-tolylazobutyramidine, p-tolylazoisopropylamide, p-tolylazopentylamidine, α(phenylazo) β-aminocumene, α(tolylazo) β-aminocumene, α(phenylazo) p-aminotoluene, etc.

Where $R_1$ is aryl or alkaryl and $R_2$ is aminoaryl, amidinylaryl, aminoalkaryl, or amidinylalkaryl: 4-aminoazobenzene, 3-aminoazobenzene, N,N'-dimethyl-4-aminoazobenzene, 1-amino-2,2'-azonaphthalene, etc.

Where $R_1$ is alkyl or aralkyl and $R_2$ is aminoalkyl, amidinylalkyl, aminoaralkyl or amidinylaralkyl: aminodiazomethane, methylazobutyramidine, 2-methylazoisopropylamine, α-ethylazo β-aminocumene, α-methylazophenethylamine, etc.

Where $R_1$ is alkyl or aralkyl and $R_2$ is aminoaryl, amidinylaryl, aminoalkaryl or amidinylalkaryl: p-aminophenylazomethane, o-aminoxylyazoisopropane, 6-amino-2-naphthylazoethane, 2(p-aminophenyl)-1-phenylethane, etc.

Where $R_1$ and $R_2$ contain amino or amidinyl groups: 4,4'-diaminoazobenzene, 3,3'-dimethyl-4,4'-diaminoazobenzene, 6(p-aminophenylazo)-2-naphthylamine, 2,2'-azobisisobutyramidine, α,α'azobis (p-quanyltoluene), azobisisopropylamine, azobismethylamidine, etc.

In a preferred embodiment, $R_1$ and $R_2$ are a single alkylene group, thereby forming a heterocyclic azo compound. These hetercyclic initiators are represented by the following:

wherein:

R is selected from the class consisting of alkylene, alkylalkylene, arylalkylene;

X is a basic nitrogen group; and the total carbons in said compound is between about 2 and 20.

Preferably, these heterocyclic azo compounds have secondary or tertiary carbons vicinal to the azo nitrogen. Representative of the aforementioned azo compounds are: 3,5-diamindinyl-1,2-diaza-1-cyclopentene, 3-methyl-3,4-diamidinyl-1,2-diaza-1-cyclopentene, 3-ethyl-3,5-diamidinyl - 1,2 - diaza - 1 - cyclopentene, 3,5 - dimethyl-3,5-diamidinyl-1,2-diaza-1-cyclopentene, 3,6-diamidinyl-1,2-diaza-1-cyclohexene, 3-propyl-3,6-diamidinyl-1,2-diaza-1-cyclohexene, 3-isopropyl-3,6-diamidinyl-1,2-diaza-1-cyclohexene, 3-amyl-6-methyl-3,6-diamidinyl-1,2-diaza-1-cyclohexene, 3-phenyl-3,5-diamidinyl-1,2-diaza-1-cyclopentene, 3,5 - diphenyl - 3,5 - diamidinyl - 1,2 - diaza - 1 - cyclopentene, 3-methyl-5-phenyl-3,5-diamidinyl-1,2-diaza-1-cyclopentene, 3-phenyl-3,6-diamidinyl-1,2-diaza-1-cyclohexene, 3,6-diphenyl-3,6-diamidinyl-1,2-diaza-1-cyclohexene, 3-(p-aminophenyl)-1,2-diaza-1-cyclopentene, 3,5-di(aminomethyl) - 1,2-diaza-1-cyclopentene, 3-aminoisopropyl-1,2-diaza-1-cyclohexene, 3-ethyl-6-(o-aminophenyl)-1,2-diaza-1-cyclohexene, 3,8-diamidinyl-1,2-diaza-1-cyclooctene, 5-(p-aminophenyl)-1,2-diaza-1-cyclodecene, etc.

The aforementioned cyclic azo compounds can be readily obtained from the corresponding diketone compound by reacting, in the first step, the diketone with hydrogen cyanide and hydrazine at temperatures between about 0° and 100° C. and pressures sufficient to maintain liquid phase conditions. The ensuing reaction forms a heterocyclic hydrazine which can thereafter be oxidized with bromine to yield the heterocyclic compound containing the azo linkage that bridges the original ketocarbons to form the ring and which also contains an appendant nitrile group from each of the former keto-carbons of the parent compound. The dinitrileazocyclo compound can thereafter be converted to an imidinyl compound by treating it with an alcoholic solution of a halogen acid, e.g., hydrogen chloride in ethanol at temperatures from about 0° to 15° C. and thereafter contacting with ammonia at a temperature between about 5° and 20° C. to convert the nitrile groups to amidinyl groups.

In reaction II, carboxylic or sulfonic acid radicals and salts thereof can be employed as the anionic group on the organic addent to serve as the link between the polypeptides and the synthetic polymer. Polymers which contain a single, terminally positioned carboxylic acid group can be obtained by the polymerization of a variety of vinyl monomers with initiators such as azo compounds having the following structure:

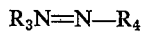

wherein:

At least 1 and preferably both $R_3$ and $R_4$ contain an anionic group such as a carboxylic or sulfonic acid radical; and $R_3$ and $R_4$ are selected from the class consisting of aryl, alkaryl, carboxyaryl, carboxyalkaryl, carboxyalkyl, carboxyaralkyl, sulfoaryl, sulfoalkaryl, sulfoalkyl and sulfoaralkyl.

As with the aforedescribed cationic azo compounds, the anionic azo compounds also preferably have secondary or tertiary carbons vicinal to the azo nitrogen. Representatives of this class of bifunctional azo compounds are the following: 5,5'-azo-bis-5-cyanohexanoic acid, 2,2'-azo-bis-2-cyanobutyric acid, 4,4'-azo-bis-4-cyanooctanoic acid, α,α'-azo-bis-α-methyl-p-toluic acid, 4,4'-azo-bis-pentanoic acid, 2,2'-azo-bis-2-cyanopentanoic acid, α,α'-azo-bis-p-ethylbenzene sulfonic acid, azobenzenesulfonic acid, etc.

The aforementioned azo carboxylic acids can be prepared by known chemistry; see Journal of the Chemical Society, 1955, p. 4256. Briefly, the preparation comprises reacting, at a temperature of about 25° to 70° centigrade, a keto-acid or the alkali metal salt of the acid in an aqueous medium with hydrazine sulfate and sodium cyanide to form the sodium salt of an azine-bis-cyano-acid, treating the salt to liberate the acid and then oxidizing the azine-bis-cyano acid to the azo-bis-cyano-acid by treatment with bromine at about −5° to 10° C. If desired, the sodium cyanide can be eliminated to avoid introducing a cyano group in the acid; however, the resultant azone compound must then be hydrogenated to obtain the hydrazine. Typical of starting materials are the following: levulinic acid, acetoacetic acid, acetophenone carboxylic acid, acetobutyric acid, acetovaleric acid, etc. The azo sulfonic acids can be prepared by a similar reaction on the sulfonated ketones, e.g., the reaction of acetophenone sulfonic acid with hydrazine sulfate to prepare the α,α'-bis-azine-p-ethylbenzene sulfonic acid which can be hydrogenated by treatment with hydrogen over a noble metal catalyst to prepare the hydrazine that can then be oxidized with bromine to α,α'-bis-azo-p-ethylbenzene sulfonic acid. In another preparation, azo sulfonic acids can be prepared by azo coupling with nitrous acid of aminoaryl sulfonic acids such as orthanilic acid.

Heterocyclic anionic azo initiators can also be prepared and used with the same advantage as use of the heterocyclic cationic zero initiators, namely, reduction in the amount of uncombined polymer in my graft propagation method. Again, these initiators have the general formula:

wherein:

X is a carboxylic or sulfonic acid radical;

R is selected from the class consisting of carboxyalkylene, carboxyarylalkylene, carboxyalkylalkylene, sulfoalkylene, sulfoarylalkylene and sulfoalkylalkylene; and The total number of carbons in said compound is between about 3 and 20.

Representative of the aforementioned compounds are:

3,5-dicarboxy-1,2-diaza-1-cyclopentene,
3,5-dimethyl-3,5-dicarboxy-1,2-diaza-1-cyclopentene,
4(p-carboxyphenyl)-1,2-diaza-1-cyclopentene,
5-(2-carboxyisopropyl)-1,2-diazo-1-cyclodecene,
3-methyl-5-sulfophenyl-1,2-diaza-1-cyclopentene,
3,7-dimethyl-5-sulfophenyl-1,2-diazo-1-cyclopentene, etc.

These cyclic initiators can be derived from a diketone compound by reaction with hydrogen cyanide and hydrazine to form a dinitrile heterocyclic hydrazine in the manner previously described. To obtain the carboxylic acid derivatives, this compound can then be hydrolyzed at temperatures between about 25° and 100° C., preferably with an acidic aqueous medium to hydrolyze the nitrile groups to carboxylic acid radicals. Then the compound is treated with an oxidant, e.g., bromine to convert the hydrazine to an azo compound in the previously discussed manner. The sulfonic acid heterocyclic azo compounds can be derived by use of a sulfodiketone in the initial reaction, e.g., sulfobenzoylacetone, 4-sulfophenyl-2,6-heptadione, etc.

Any of the vinyl compounds that are readily polymerized by initiation with a free radical can be polymerized by the aforementioned cationic and anionic azo compounds. As used herein, vinyl compounds include all ethylenically unsaturated monomers that can be polymerized through aliphatic unsaturation by free radical initiation. The term vinyl thus includes vinyl, vinylene and vinylidene compounds. While it is preferred to employ at least one monoolefinic monomer to obtain a substantially linear polymer, the copolymerization of such a monomer with a diolefin, e.g., butadiene, and even the homopolymerization of a diene is within the scope of my invention. In general, such vinyl monomers include the following:

Hydrocarbon olefins and diolefins such as ethylene, propylene, butene-1, isobutylene, butadiene, pentene-1, isopentene, pentadiene, isoprene, hexene, isohexene, isoheptene, heptadiene, octene, isooctene, nonene, decene, styrene, methylstyrene; vinyl naphthalene, etc.;

Vinyl halides such as vinyl fluoride, vinyl chloride, vinylidene chloride, fluorotrichloroethylene, chlorostyrene, chloroprene, etc.;

Acrylics such as acrylic acid, methacrylic acid, acrylamide, methacrylamide, acrylonitrile, methacrylonitrile, methyl methacrylate, methyl acrylate, ethyl acrylate, ethyl methacrylate, propyl acrylate, iso-propyl methacrylate, isobutyl acrylate, amyl methacrylate, hexyl methacrylate, lauryl methacrylate, stearyl methacrylate, etc.;

Vinyl ethers such as ethyl vinyl ether, isopropyl vinyl ether, butyl vinyl ether, etc.;

Vinyl esters such as vinyl acetate, vinyl propionate, vinyl isobutyrate, vinyl benzoate, diallyl phthalate, divinyl terephthalate, vinyl naphthoate, etc.; and Miscellaneous vinyl compounds such as vinyl pyridine, vinyl carbazole, vinyl pyrrolidone, etc.

Any of the aforementioned monomers or mixtures thereof can be polymerized or copolymerized with the free radicals prepared in accordance with my invention using otherwise conventional techniques in the art. Thus, emulsion, bulk or solution polymerization can be employed.

As previously mentioned, the preferred embodiment of my invention comprises base exchanging a suitable ionically charged polymerization initiator onto the polypeptide and thereafter employing the polypeptide-initiator complex to initiate polymerization of a suitable vinyl monomer and thus graft propagate a polymer chain from the polypeptide. In this manner, the steric hindrance and relative immobility of the long macromolecules of the ionically terminated vinyl polymer are avoided and a relatively high quantity of a suitable polymer can be grafted onto the polypeptide.

In regard to my preferred graft propagation of a polymer chain from the polypeptide, the use of the aforementioned heterocyclic azo cations or anions affords an advantage in that use of such an initiator reduces the amount of uncombined polymer formed since decomposition of the cyclic initiator merely opens the ring and provides a single fragment bearing a free radical at each end. The decomposition of the acyclic azo initiators divides the compound and yields two fragments, each bearing a free radical that is capable of initiating polymerization. Even when both ends of the acyclic initiator contain a cationic group, some homopolymer can nevertheless form during polymerization because, statistically, not every initiator will be bonded to the polypeptide at both cationic groups. The resultant graft copolymer is highly stable even when subjected to base exchange conditions because the polymer that is grafted to the polypeptide is highly unreactive and hence does not readily participate in base exchange reactions necessary to sever it from the polypeptide molecule. In my preferred embodiment, any of the aforementioned polymerization initiators having one or more ionically charged groups can be base exchanged onto the polypeptide in accordance with reaction I or reaction II.

The resultant polypeptide-initiator complex prepared in accordance with my invention can be employed for initiation of polymerization of any of the aforementioned ethylenically unsaturated monomers. Again, as in the case where the initiator only is employed, emulsion, bulk or solution polymerization can be employed. These polymerization conditions are hereafter described.

As previously mentioned, the addition of the ionically charged addent, i.e., the ionically charged synthetic polymer or the ionically charged polymerization initiator to the polypeptide, is performed under suitable base exchange conditions. The synthetic organic addent, be it the anionic or cationic polymerization initiator or the cationic or anionic polymer, can be readily prepared from the aforementioned organic compounds having either a basic nitrogen group or from the aforementioned organic compounds having a carboxylic acid group. The cationic addent can be prepared from a basic nitrogen compound by dissolving the compound in a suitable inert solvent such as benzene, chloroform, methylethyl ketone, dichlorobenzene, formamide, dimethyl formamide, acetone, hexane, trichloroethane, cyclohexane, isopropylacetate, ethyl propionate, toluene, amyl bromide, xylene, n-butyl ether, etc., and thereafter adding a dilute acid to form the cationic group, e.g., the ammonium or amidinium salt of the organic addent. Suitable acids are hydrochloric, acetic, phosphoric, sulfuric, nitric, etc. If desired, a quaternary salt can be formed by the addition of organic esters of mineral acids in lieu of the aforementioned acids. Examples of such are methyl sulfate, triethyl phosphate, ethyl nitrate, etc. or by the addition of alkyl halides such as methyl chloride, ethyl fluoride, etc.

By any of these methods, the basic nitrogen of the organic compound is converted to its highest positive valency which, upon addition of water, gives rise to an organic cation. This is suitably accomplished by the addition of about 0.1 to 10 parts of water to each part of the organic solution.

The anionic polymer or polymerization initiator comprises the azo-carboxylic acid or the aforementioned polymers that are terminated in a carboxylic acid group. This acid can be employed as such for the base exchange reaction II or can be neutralized with an alkali and the resultant salt employed in the base exchange reaction. As previously mentioned, any water soluble salt of the acid can be employed; preferably the alkali metal salts, i.e., sodium, potassium or lithium are used.

The ionically charged organic addent, be it the polymer or the polymerization initiator, is thereafter admixed with a suitable dispersion of the polypeptide, whereupon the polypeptide-graft copolymer or the polypeptide-initiator complex is formed by conventional base exchange of the organic cation for the cation present on the polypeptide (reaction I) or of the organic anion for the anion present on the polypeptide (reaction II). If desired, it is of course apparent that the several steps described above can be simultaneously performed by the addition of the dilute mineral acid, water and polypeptide suspension to the organic solution of the organic addent, or simply by the addition of the organic addent to an acidified aqueous suspension of the polypeptide.

The polypeptide-graft copolymer or polypeptide-initiator complex is a very stable product since the ionic bond of the organic addent to the polypeptide is stable. As previously mentioned, the ionically charged organic addent is quite large, e.g., a polystyrene macromolecule. Accordingly, the organic addent can not be readily base-exchanged from the polypeptide because of its high immobility. Consequently, the adducts are very stable and resistant to organic solvents and even to base exchange conditions such as are employed in their formation.

When the ionically charged organic addent employed in the base exchange step I or II is a synthetic polymer, the polypeptide graft copolymer can be separated from the aqueous solution used in its preparation by any suitable solid-liquid separation techniques and dried. When the organic addent comprises the polymerization initiator, as in the preferred embodiment of my invention, a graft copolymer can be directly derived therefrom by addition of suitable quantities of the desired ethylenically unsaturated monomer to the suspension followed by heating of the resultant suspension to the suitable activation temperature to decompose the polymerization initiator and form free radicals which initiate the polymerization. Because at least half such free radicals are bonded to the polypeptide, a high proportion of the resultant polymer is bonded to the polypeptide.

The polypeptide-initiator adduct can also be separated from the aqueous solution employed in its preparation and the resultant solid can be stored, handled and thereafter employed in a polymerization to obtain the graft copolymer. The polypeptide-initiator complex prepared in accordance with my invention can thereafter be employed for the initiation of polymerization of various vinyl monomers. As previously mentioned, emulsion, bulk or solution polymerization can be employed. The initiators are well suited to bulk homo- or copolymerization by the dispersion of between about 0.05 and about 10,000 parts by weight of the polypeptide-initiator complex in 100 parts by weight of the monomer. Preferably between about 20 and about 2000 parts by weight of initiator complex per 100 parts of any of the aforementioned monomers is employed. The resultant dispersion is thereafter heated, preferably under nitrogen, to between about 25° and about 125° C. to decompose the azo radical and initiate polymerization.

Emulsion homo- or co-polymerization of the aforementioned monomers can also be performed with use of my polypeptide-initiator complex. Examples of various monomers that can very readily be emulsion polymerized are butadiene, styrene, butadiene-styrene, vinyl acetate, vinyl chloride and acrylic acid esters such as methylmethacrylate, ethylacrylate, lauryl methacrylate, acrylonitrile, etc. In general, the emulsion is formed by the addition to the reactants of about 0.1 to about 5.0 percent (based on the amount of the monomer) of a non-ionic emulsifying agent, e.g., condensates of ethylene oxide with alkylphenols, fatty acids, fatty alcohols, and fatty amides which preferably have hydrophobic groups containing between about 10 and about 24 carbons and between about 14 and 15 ethylene oxide units. Emulsions containing from 5 to about 300 parts by weight of the monomer in 100 parts water can be used, preferably the monomer is used in an amount between about 10 and about 200 parts per 100 parts of water. The polypeptide-initiator complex can be used in amounts between about 0.05 and about 10,000 parts per 100 parts of monomer; preferably in amounts between about 0.2 and about 200 parts per 100 parts of the monomer.

Solution polymerization of the aforementioned monomers or copolymerization of mixtures of the monomers can also be conducted in various solvents such as benzene, cyclohexane, n-hexane, ethylbenzene, trichlorobenzene, dimethyl formamide, pentane, heptane, acetone, methanol, etc. The monomer or mixture of monomers is added to the solvent, generally in an amount between about 5 and about 300 parts per 100 parts of solvent. Preferably between about 10 and about 200 parts of monomer per 100 parts of solvent are used. The polypeptide-initiator complex of my invention can readily be dispersed in any of the aforementioned solvents in the necessary amounts, e.g., between about 0.05 and about 500 parts per 100 parts of monomer and preferably between about 0.2 and about 200 parts per 100 parts of monomer can be employed. Upon heating to the selected initiation temperature, between about 25° and about 80° C., the azo nitrogen-carbon bonds of the polypeptide-initiator complex of my invention are homolytically cleaved and free radicals are generated which react with the monomer to initiate polymerization. In any of the aforedescribed polymerization techniques, polypeptide graft copolymers are obtained wherein the synthetic polymeric material is grafted to the polypeptide through a cationic group linkage, preferably through a basic nitrogen radical.

The following examples will illustrate my invention and demonstrate the results obtainable therewith:

Example 1

This illustrates the preferred technique of adducting a polypeptide with a cationic azo polymerization initiator and thereafter graft propagating a synthetic polymer chain from the polypeptide. A polypeptide, 1.85 grams of white wool, was placed in a flask and covered with 100 milliliters of distilled water containing 3 milliliters of a 5 percent sodium hydroxide solution. The flask was stirred and a solution of 0.1 gram of azobisisobutyramidine chloride in 25 milliliters of distilled water was added. The stirring was continued for 1 hour at room temperature. The wool was then removed from the flask, filtered and washed with distilled water to remove occluded salts. The washed wool-initiator complex was then added to an emulsion containing 160 milliliters of distilled water, 10 milliliters of acrylonitrile and 1 milliliter of a non-ionic emulsifier. Triton X-155.

The emulsion was maintained at 60° Centigrade for 2 hours with occasional shaking. After the 2 hour period, the wool was removed from the flask, washed in distilled water and dried at 70° Centigrade for 1 hour. The constant weight of the wool when dried was 2.85 grams indicating 1.0 gram of polyacrylonitrile had been formed thereon. The wool was thereafter subjected to extraction with N,N-dimethyl formamide at room temperature. Repeated extractions and weighings indicated that none of the polyacrylonitrile could be removed from the wool.

Example 2

Polymethacrylate was graft polymerized on wool by the following method. Wool, 5 grams, was added to 100 milliliters of distilled water containing 0.05 grams azobisisobutyramidine hydrogen chloride. The wool was thereafter removed, excess water squeezed therefrom, rinsed thoroughly and dried. The dried wool-azobisisobutyramidine complex was then added to an emulsion of 20 grams methylmethacrylate in 100 milliliters of distilled water. The mixture was shaken, purged with argon and then heated to 60° C. and held at that temperature for 5 hours with occasional shaking.

The wool-like fiber was then removed from the reaction mixture, rinsed with water; then with methanol. The solid was refluxed with benzene at atmospheric pressure for about 16 hours, then removed and dried. The wool derivative weighed 8.0 grams indicating that 3.0 grams of polymethacrylate had been grafted thereto. The benzene extract was evaporated and the residue weighed 1.7 grams indicating a copolymerization efficiency of 64 percent.

The preceding examples are intended solely to illustrate a mode of practice of my invention and to demonstrate the results obtainable thereby. The invention is not to be unduly limited by these examples.

I claim:

1. The method for graft propagating a polymer from a naturally occurring polypeptide that comprises reacting an organic azo compound selected from the class consisting of $R_1$—N═N—$R_2$, wherein $R_1$ and $R_2$ are selected from the class consisting of aminoaryl, amidinoaryl, aminoalkaryl, amidinoalkaryl, amidinoalkyl, aminoalkyl, amidinoaralkyl and aminoaralkyl; and

wherein R is selected from the class consisting of alkylene and aralkylene and X is a basic nitrogen group with said polypeptide under base exchange conditions so as to form an ionic bond between an ion exchange site of polypeptide and said ionically charged group of said organic azo compound thereby forming a polypeptide azo complex, mixing said complex with an ethylenically unsaturated monomer that undergoes polymerization through aliphatic unsaturation by free radical initiation, heating the resultant mixture to decompose the azo radical of said complex by homolytic fission thereby obtaining free radicals which are ionically bonded to said polypeptide and which initiate the polymerization of said monomer to graft propagate said polymer from said polypeptide.

2. The method of claim 1 wherein said organic azo compound is acyclic and said ionically charged group comprises a basic nitrogen.

3. The method of claim 2 wherein said organic azo compound is 2,2′-azobisisobutyramidine.

4. The method of claim 1 wherein said ion exchange groups of the azo compound are basic nitrogen groups.

5. The method of claim 1 wherein the azo radical of said organic azo compound is contained in the ring of a heterocyclic compound.

References Cited

UNITED STATES PATENTS 3,208,984　9/1965　Dekking.
3,083,118　3/1963　Bridgeford _____ 8—128

FOREIGN PATENTS 1,092,655　5/1961　Germany.
  611,829　11/1948　Great Britain.

OTHER REFERENCES

British Plastics, "The Cross-Linking of Protein Plastics," November 1950, vol. 23, page 157, Pinner.

Chem. Abst., vol. 55: 26546f, "Graft Copolymerization by Using Azo Compounds," Vollmert et al.

Chemical Abstracts, col. 59: 2977, Korshak et al., "Grafting of Vinyl Monomers to Silk and Wool."

WILLIAM H. SHORT, *Primary Examiner.*

E. M. WOODBERRY, *Assistant Examiner.*

U.S. Cl. X.R.

8—127.5, 128.5